June 20, 1961  G. E. SEUFERT ET AL  2,988,842
MEANS FOR SUSPENDING A CAKE OF SOAP AND THE LIKE
Filed April 2, 1959
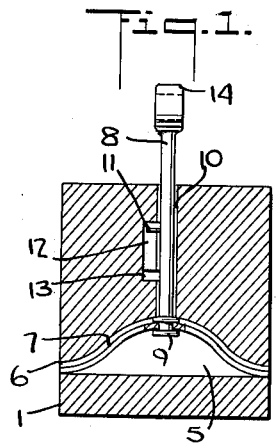
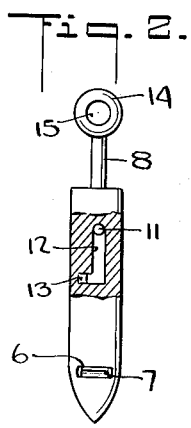
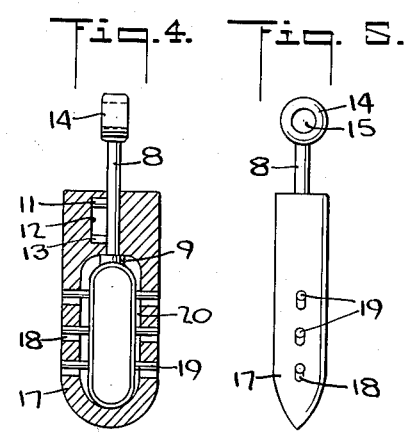
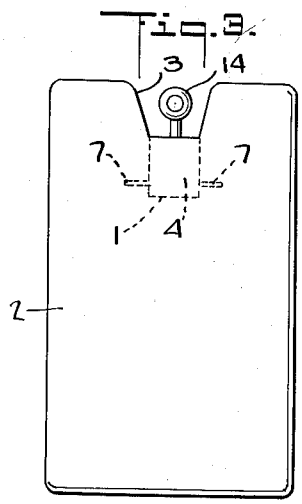
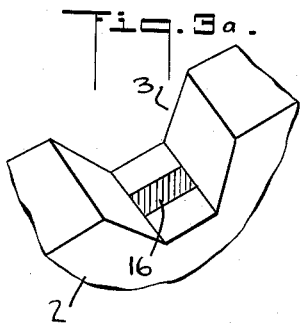
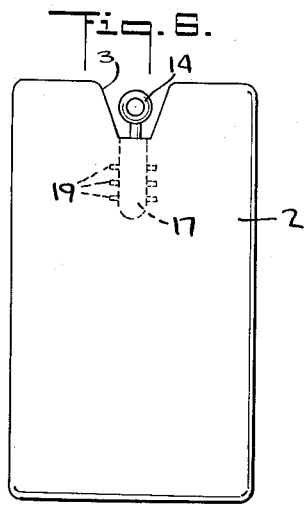
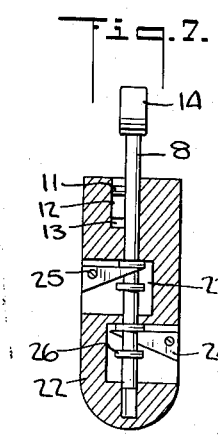
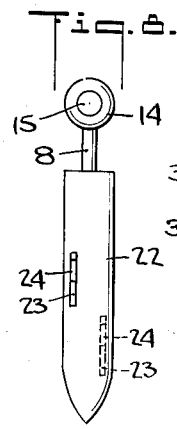
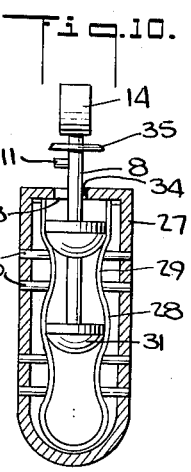
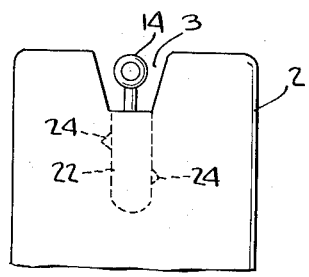
INVENTORS
GEORGE E. SEUFERT
JANET H. SEUFERT
BY
ATTORNEYS United States Patent Office 2,988,842
Patented June 20, 1961

2,988,842
MEANS FOR SUSPENDING A CAKE OF SOAP AND THE LIKE
George E. Seufert and Janet P. H. Seufert, New York, N.Y. (both of 67—45 Clyde St., Forest Hills 75, N.Y.)
Filed Apr. 2, 1959, Ser. No. 803,798
3 Claims. (Cl. 45—28)

Our invention relates to means for suspending a cake of soap or other soluble material or a detergent, cleansing or cosmetic substance, after the cake has been used and is therefore wet, so that it can be conveniently hung up on a support and not laid out to dry on a surface to which it would adhere in drying and leave a film on said surface when the soap is taken for further use. The film is gelatinous and can only be washed away.

In its preferred form, the invention comprises a member which can be inserted either during manufacture, or after manufacture by the user, into a cavity in a cake far enough so that the member lies fully within the peripheral outline thereof. Hence the cake will have no projecting parts to chafe the hands or catch the threads of a cleaning cloth on which the cake may be rubbed.

The nature and objects and the advantages of the invention are described in the following specification, and the drawings show several embodiments of our improvement. All of the characteristics of the various forms displayed herein are defined in the appended claims, and we of course reserve the right to make changes in structural details without departing from the principle which underlies all the modifications set forth herein.

FIGURE 1 is a longitudinal section through an inset member according to our invention.

FIGURE 2 is a side view thereof partly in section.

FIGURE 3 shows a cake of soap or other soluble material with the member anchored into the cake.

FIGURE 3a is a detail view showing the form of a recess and cavity in said cake to receive the member.

FIGURE 4 is a longitudinal sectional view of another form of inset member.

FIGURE 5 is a side view thereof.

FIGURE 6 shows this modified inset member anchored into a cake.

FIGURE 7 is a sectional view of another modification of our inset member.

FIGURE 8 is a side view of said other modification.

FIGURE 9 is a view of a cake of soap with said last-named member incorporated.

FIGURE 10 is a longitudinal sectional view of a further modification of our inset member.

Referring first to FIGURES 1, 2, 3 and 3a, we show an inset member indicated by the numeral 1, which is to be inserted and anchored into a cake 2, said cake having a recess 3 in one edge at an end. This recess is trough-shaped and extends through the cake from one face of the cake to the other and is open at both extremities.

The inset member 1 is substantially flat and rectangular in shape, and of greater breadth and thickness. Inside, between the two wide faces 4 thereof and adjacent one end is a pocket 5 which is open at its ends 6 in the sides or narrow faces of the member, and within this pocket is a flat, bow-shaped strip of elastic metal or other suitable material 7, the ends of which are in line with the openings 6. This strip 7 is connected at its mid point to a stem 8 which has collars 9 at its inner or lower end engaging both faces of the strip, so that when the shank 8 is pushed down, it forces the mid part of the strip 7 downward to cause the ends thereof to protrude from the openings 6. The shank 8 is located in a bore 10 which extends inward from the opposite end of the member 4 to the pocket 5, and the stem 8 has a projection 11 which engages a longitudinal slot 12 at one side of the bore 10. The outer or upper end of the stem 8 has a flattened head 14 with an aperture 15 therein to engage a pin in a supporting surface, so that the inset member and the cake can be hung up after using to dry.

The member 1 is inserted into a cavity 16 at the bottom of the recess 3 and it fits into this recess from end to end thereof. It is inserted with the ends of the strip 7 withdrawn, but after insertion the stem 8 is pushed to flatten to some extent the strip 7, so as to cause the ends thereof to project as barbs into the mass of soap at the sides of the cavity 16. At the end of its inward or downward movement, the stem 8 is turned so that the perforated head 14 is disposed crosswise of the recess 3 and the stem is held in this position because when it is thus turned, the projection 11 enters a notch 13 at the inner end of the slot 12 and is latched against outward movement. The ends of the strip 7 serve as barbs to prevent the separation of the member from the cake.

The cake can be used in the ordinary way because the perforated head 14 in its final position is within the peripheral outline of the cake and does not rub against the hands or cloth when the cake is moistened and used. After being wetted, the cake can be suspended by the head 14 by slipping the head over a nail, hook or other projection. The cake, therefore, dries out of contact with a supporting surface and does not adhere to such a surface and leave a film thereon as it dries, and thus loss and waste of the cake is avoided.

FIGURES 4, 5 and 6 show another form of inset member comprising a body 17 having an enclosed space 21 containing an elongated loop 20 of some elastic, metal or other material which is smaller than the space 20, so that it can expand therein and this band has a number of barbs 19 alined with openings 18 in the sides of the body of this member 17, to be projected after the member is inserted into a cake. The loop is in contact with one end of the inside space 21 and engaged at its opposite end by a flange or collar 9 on the inner or lower end of the stem 8. This member 17 is inserted as before into a cavity at the bottom of recess 3, with the stem 8 in its outermost position. When the body of the member is fully within the cavity of the recess, the stem 8 is pushed down so as to expand the loop and force the barbs 19 outward into the cake, thus anchoring the member in the cake. The stem is rotatable as before, and when it is at the inner or downward end of its movement, it is turned to force the projection 11 into the notch 13 at the inner end of the slot 12. The stem is thus held against outward or upward movement and the loop remains expanded and holds the barbs 19 in engagement with the soap 2. The head 14 on stem 8 again is wholly within the recess 3 and does not project beyond the peripheral outline of the soap 2. The head 14 lies across the recess 3 and is wholly within it.

In FIGURES 7 and 8, the inset member comprises a body 22 with hollow spaces 23 therein, each of these spaces opening through one side of this member. Each space 23 contains a part 24, which has the shape of a triangle and is mounted on a pivot 25 at one corner. The stem 8 is so mounted that it passes between the elements 24 and has collars 26 by which these elements 24 can be actuated. Each of the elements 24 is pivoted near the open end of the recesses 24; and when the stem 8 is pushed downward or inward, the elements 24 are swung about their pivots so that one corner will project as indicated in FIGURE 9. Before the stem is pushed inward or downward, the perforated head 14 lies parallel to the recess 3, but after the member is inserted into a cake, as shown in FIGURE 9, the stem 8 is turned as before so that the projection 11 enters the notch 13 and holds the stem against outward or upward movement. When it is pushed in, the head 14 on stem 8 is again within the peripheral outline of the cake, and is positioned crosswise across the recess.

FIGURE 10 shows another modification comprising a shell 27, in which is a strip or band 28 of flexible material bent on itself which extends from one end of the shell to the other and has contracted or concave portions 29. On the outer faces of both sides of this band, affixed to the portions 29, are barbs 30 which are in openings in the outer shell; and within the band is a stem 8 which has hemispherical knobs 31 normally in position to enter the concave portions 29 of the band. When the stem is pushed inward or downward, the knobs 31, with their curved faces, expand the concave portions 29 and force the barbs 30 outward into the soap. On its downward or inward movement, the projection 11 on stem 8 passes through a notch 33 in an opening 34 in the adjacent end of the shell and a slight twist of the stem will carry the projection out of alinement with the notch 33 in this opening, so that the stem cannot return to is original position until it is rotated again to bring this projection in line with the notch 33. When the stem 8 is pushed inward or downward, the top end of the shell is closed by a collar 35 on the stem 8. When this modification is inserted in a cake of soap, the turning of the stem 8 again brings the head 14 into crosswise position in the recess 3 so that the soap can be hung up as before. The shell 8 is closed at one end, and the edges turned in at the other end to keep the loop 28 in place.

Having described my invention, what we believe to be new is:

1. An inset member to be inserted into a cavity at the bottom of a recess in an edge of a cake of soap, said inset member comprising a body having spaces therein open through the opposite sides thereof, pivoted elements with points in said spaces and a movable rod having collars to engage said elements to move said elements and cause a point on each element to project without said member into engagement with the cake and be held against separation from the cake, the stem having a perforated head which is then disposed in said recess, and does not project beyond the peripheral outline of said cake.

2. An inset member for insertion into a cavity at the bottom of a recess in the edge of a cake of soap, said member having barbs therein aligned with openings in its sides, and a stem translatably movable longitudinally in said cavity so as to impel said barbs outwardly approximately perpendicular to said stem's movement and into anchoring embedment in said cake to anchor said member in said recess; said stem having a perforated head at its upper end which is then disposed crosswise in the recess and is entirely within the peripheral outline of said cake when the member is inserted and secured in place.

3. An inset member to be inserted into a cavity at the bottom of a recess in an edge of a cake of soap, said inset member comprising a body having a plurality of spaces therein, at least one space being at each of the opposite sides of said body, and all spaces communicating with the opposite sides of said body so as to present openings therein, elements eccentrically pivoted in said spaces so as to present points which are pivotable so as to project without said openings, and a movable rod having collars to engage said pivoted elements so as to pivot said elements when said rod is moved in a longitudinal direction, said elements being pivotable outwardly of said openings when said rod is moved in one direction and being further pivotable inwardly of said openings when said rod is moved in a second reversed direction, said elements being thereby engageable with said cake, the stem having a perforated head which is then disposed in said recess, and does not project beyond the peripheral outline of said cake.

References Cited in the file of this patent

UNITED STATES PATENTS

| 476,362 | Breisch | June 7, 1892 |
| 487,094 | Offinger | Nov. 29, 1892 |
| 898,897 | Jungclaus | Sept. 15, 1908 |
| 2,447,913 | Robison | Aug. 24, 1948 |

FOREIGN PATENTS

| 585,567 | France | Mar. 3, 1925 |